United States Patent [19]

Olsson et al.

[11] Patent Number: 4,705,074

[45] Date of Patent: Nov. 10, 1987

[54] MIXER TAP

[75] Inventors: Per I. Olsson; Yngve G. Sedwall, both of Mjölby, Sweden

[73] Assignee: Danfoss A/S, Nordborg, Denmark

[21] Appl. No.: 872,634

[22] Filed: Jun. 10, 1986

Related U.S. Application Data

[63] Continuation of Ser. No. 585,433, Mar. 2, 1984, abandoned, which is a continuation of Ser. No. 364,467, Apr. 10, 1982, abandoned.

[30] Foreign Application Priority Data

Apr. 4, 1981 [DE] Fed. Rep. of Germany ....... 3113653

[51] Int. Cl.⁴ ............................................ F16K 11/074
[52] U.S. Cl. ................................. 137/625.46; 137/876; 137/887
[58] Field of Search .................. 137/625.11, 625.21, 137/625.46, 862, 876, 887

[56] References Cited

U.S. PATENT DOCUMENTS

| | | | |
|---|---|---|---|
| 330,164 | 11/1885 | Sloan | 137/625.11 |
| 749,990 | 1/1904 | Holinger | 137/625.46 |
| 914,407 | 3/1909 | Gold | 137/625.21 |
| 1,136,589 | 4/1915 | Davis | 137/625.46 |
| 1,198,216 | 9/1916 | Hanson | 137/625.46 |
| 1,968,390 | 7/1934 | Hamilton | 137/887 |
| 2,736,339 | 2/1956 | Asbury et al. | 137/625.46 |
| 3,405,734 | 10/1968 | Smit et al. | 137/625.46 |
| 3,545,487 | 12/1970 | Kinner | 137/625.46 |
| 3,949,967 | 4/1976 | Kratfel | 137/625.46 |
| 4,083,290 | 4/1978 | Andres | 137/625.11 |
| 4,161,191 | 7/1979 | Ranger et al. | 137/625.46 |
| 4,327,758 | 5/1982 | Uhlmann | 137/625.17 |

FOREIGN PATENT DOCUMENTS 3113653 10/1982 Fed. Rep. of Germany .

Primary Examiner—Alan Cohan
Assistant Examiner—John Rivell
Attorney, Agent, or Firm—Wayne B. Easton; Clayton R. Johnson

[57] ABSTRACT

A changeover valve for a bath and shower is disclosed which has alternative flow channels formed by three disks. In a first position fluid flow is shut off. In a second position fluid flows through axially aligned ports in the three disks and in a third position fluid flows through a generally U-shaped passage formed by two of the three disks. The second position provides greater flow than the third position.

6 Claims, 14 Drawing Figures

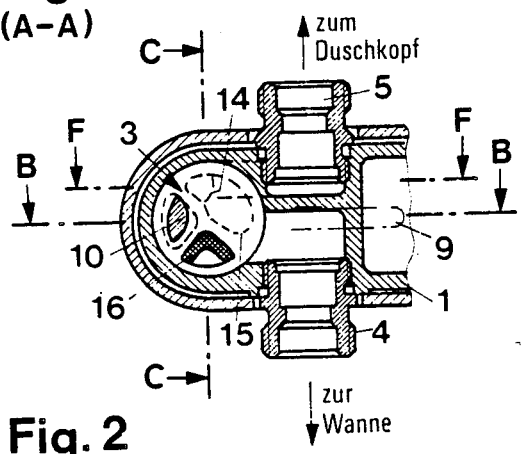
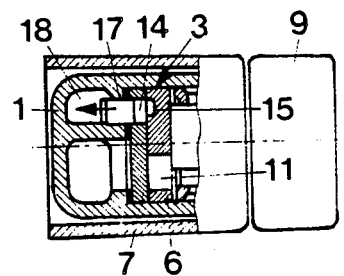
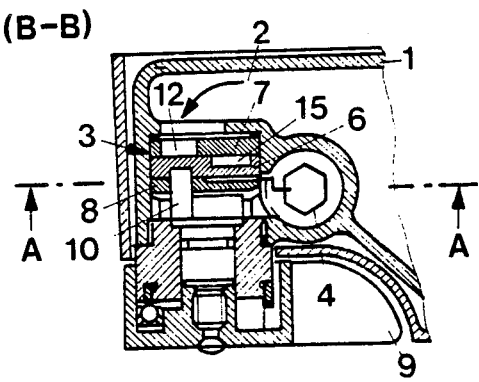
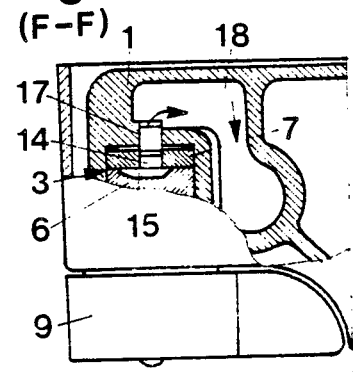
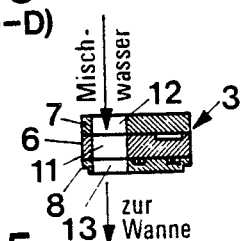
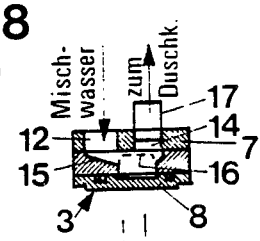
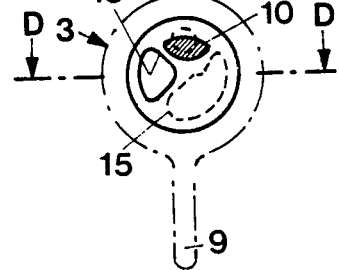
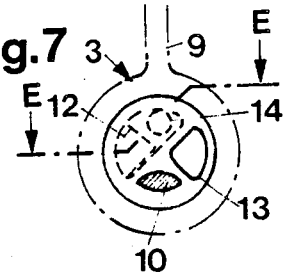

(H-H)

(G-G)

(I-I)

MIXER TAP

This application is a continuation of application Ser. No. 585,433, 3-2-84 now abandoned, which is a continuation of application Ser. No. 364,467, 4-10-82 now abandoned.

The invention relates to a mixer tap comprising a housing which has two outlet connectors branching from a mixed water passage, one of which is associated with a direct outlet and the other with a shower head, and two regulating valves for the flow of mixed water that can be shut and are associated with a respective outlet connector.

In a known mixer tap of this kind for baths or showers, a mixing valve arrangement is followed by two identical regulating valves, each having a manual operating member. The desired mixed water temperature can be set at the mixing valve arrangement and the downstream regulating valves then permit manual setting of the flow of mixed water direct to the bath or to the shower head. If the mixed water is to be diverted to the shower after flowing to the bath, or vice versa, one of the regulating valves must first be turned shut and the other opened. In this respect, operation of this known mixer tap is therefore cumbersome. Further, the maximum throughflow for both regulating valves is always equal, even though a smaller flow is generally wanted for showering. To set this smaller throughflow, care must be taken that the regulating valve associated with the shower is only partially opened. This likewise complicates operation. The two control elements of the regulating valves that are to be operated independently of each other are costly.

Mixer taps are also known, wherein independently manually operable regulating valves form the mixing valve arrangement for the flow of cold and hot water and a change-over valve with a handle is provided, through the operation of which mixed water can be passed either to the bath or to the shower head. However, this change-over valve cannot shut off the mixed water. For this purpose, both regulating valves of the mixing valve arrangement have to be shut. After each complete closing of the mixing valve arrangement, the desired temperature and the desired throughflow must therefore again be set by means of the two regulating valves of the mixing valve arrangement. Upon actuation of the change-over valve, the entire flow of mixed water is changed from bath to shower head, and vice versa. Since a different throughflow is often desired for the bath and the shower head, the throughflow and hence the temperature must be reset after each actuation of the change-over valve by operating the regulating valves of the mixing valve arrangement.

The invention is based on the problem of providing a mixer tap of the stated kind that is of simpler construction and easier to operate.

According to the invention, this problem is solved in that the regulating valves comprise a common control element which, in one of the two predetermined positions, fully opens the one regulating valve and shuts the other, in the other predetermined position fully opens the other regulating valve and shuts the one valve and, in an intermediate position, shuts both regulating valves.

In this construction, a second control element and its operation are dispensed with and yet both regulating valves can be set only successively but constantly and, if desired, both can be shut. Since the closed position is disposed between the control element positions in which one or the other regulating valve is fully open, the transition between these fully open positions is possible only through the closed position so that a sudden change over is impossible.

Preferably, the maximum flow through the regulating valve associated with the shower head is less than the maximum flow through the other regulating valve. This ensures that a smaller flow such as generally desired for showering is necessarily set even when the control element is rapidly changed from the fully open position of the regulating valve associated with the direct outlet to the fully open position of the regulating valve associated with the shower head.

A particularly simple construction can be achieved in that the regulating valves comprise at least two closely abutting discs of hard material, that the first disc is rotatable in the housing as a control element and has an aperture, that the second disc is fixed with respect to the housing and has two apertures of different size, that the larger aperture of the fixed disc corresponds to the aperture of the rotatable disc, that, in the one predetermined position of the rotatable disc, the two corresponding apertures are in registry and connect the mixed water passage to the outlet connector associated with the direct outlet and that, in the other predetermined position, a connecting passage is created between the mixed water passage and the outlet connector associated with the shower head by way of one of the two larger apertures and the smaller aperture. The aperture in the rotatable disc can, irrespective of the rotary position of this disc, always be disposed in the region of the mixed water passage cross-section so that the mixed water can for example flow direct to the bath when the two larger apertures overlap and to the shower head when the larger aperture and the smaller aperture overlap.

However, it is also possible for part of the connecting passage to be formed by a recess in the side of the rotatable disc facing the the fixed disc. In this way, when the rotatable disc is appropriately positioned, it is possible to divert the mixed water through 180° within the regulating valve arrangement if space conditions make this necessary.

It is particularly favourable, if the radial width of the opening of the smaller aperture decreases in the closing direction of the regulating valve associated with the shower head. This permits a fine setting for the throughflow of the shower head to be set particularly easily when the throughflow is weak, as is often desired for showering.

The two larger apertures preferably have the shape of segments of a circle, which permits a substantially proportional setting of the throughflow for the direct outlet, for example to the bath, depending on the rotary position of the rotatable disc.

Two preferred examples of the invention will now be described in more detail with the aid of diagrammatic drawings, in which:

FIG. 1 is a vertical section A—A in FIG. 2 of a first example of mixer tap with the regulating valve arrangement closed;

FIG. 2 is the section B—B in FIG. 1;

FIG. 3 is the section C—C in FIG. 1;

FIG. 4 is the section F—F in FIG. 1;

FIG. 5 is a view of the regulating valve arrangement of the mixer tap similar to FIG. 1 but with the one regulating valve fully open;

FIG. 6 is the section D—D in FIG. 5;

FIG. 7 is a view of the regulating valve arrangement of the mixer tap similar to FIG. 1 but with the other regulating valve fully open;

FIG. 8 is the section E—E in FIG. 7;

Figure 10:
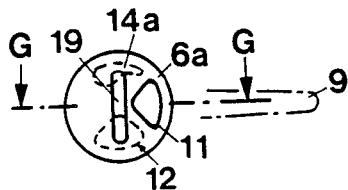
FIG. 10 is the elevation of the FIG. 9 regulating valve arrangement of the mixer tap in the closed position.

In the embodiment of mixer tap according to the invention shown in FIGS. 1 to 8, the mixer tap has a housing 1 with a mixing valve arrangement (not shown) to which hot and cold water can be passed by way of connectors (not shown) and which can be set, preferably automatically in dependence on the water temperature, leads the mixed water at the desired temperature to a mixed water passage 2 in the housing. The mixed water can be passed by way of a closable regulating valve arrangement 3 from this mixed water passage 2 selectively to an outlet connector 4 for direct outflow to a connectable outlet spout, e.g. into a bath, or an outlet connector 5 to which a shower head can be connected by a hose.

The regulating valve arrangement 3 consists of two closable regulating valves comprising a common control element in the form of a round disc 6 rotatably mounted in the housing 1, a second round disc 7 fixed with respect to the housing and a third round disc 8 likewise rotatable in the housing 1. The regulating valve arrangement 3 also has a manually actuated lever 9 which is rotatable in the housing 1 and coupled to a pin 10 eccentric to the rotary axis of the lever 9. The pin 10 engages the discs 6 and 8 eccentrically so that they can be turned relatively to the fixed disc 7 by pivoting the lever 9.

The discs 6, 7 and 8 are provided with equal apertures 11, 12 and 13, the disc 7 with a further aperture 14 smaller than the others and the disc 6 with a recess 15 in the side facing the disc 7. The recess 15 is offset from the aperture 13 by a predetermined angle and also contains a sound-damping net 16 held by the disc 8.

In the FIGS. 1 to 4 central position of the setting lever 9 or disc 6 and thus disc 8 coupled to disc 6 by the eccentric pin 10, both regulating valves are shut so that mixed water cannot flow out of the passage 2 by way of the regulating valve arrangement 3. However, when the lever 9 is swung downwardly out of the FIGS. 1 to 4 position into the FIG. 5 position, the regulating valve associated with the direct outlet by way of the connector 4 to the bath and consisting of the disc 6 and apertures 11 to 13 is opened as shown in FIG. 6, whereas the regulating valve associated with the shower head and consisting of the disc 6, the apertures 12, 14 and the recess 15 remains shut. If the lever 9 is instead swung upwardly out of the FIGS. 1 to 4 position into the FIG. 7 position, the regulating valve 6, 12, 14, 15 associated with the shower head is opened so that a connecting passage 12, 15, 14, 17 is formed by way of an extension tube 17 inserted in the aperture 14 between mixed water passage 2 and a passage 18 (FIGS. 3 and 4) leading to the connector 5.

The example of FIGS. 9 to 14 differs from the first embodiment essentially only in that the recess 15 in the rotary disc 6a and the third disc 8 are omitted. The disc 6a faces the mixed water passage 2 in housing 1a and provided with an elongate recess 19 for engagement of a connecting pin corresponding to the pin 10. The aperture 14a in the fixed disc 7a is again smaller than aperture 12 and provided with a sound-damping net 16a. The aperture 14a has a radial opening width which decreases in the closing direction of the regulating valve associated with the shower head and formed by the disc 6a and its aperture 11. The regulating valve associated with the direct outlet into the bath is formed by the disc 6a and apertures 11, 12. The aperture 12 is likewise provided with a soundnet 16b.

Figure 11:
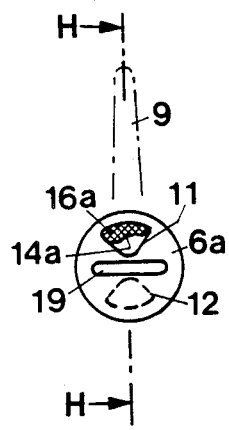
FIG. 11 is the elevation of the regulating valve arrangement of the FIG. 9 mixer tap in the open position of the regulating valve associated with the shower head.
Figure 12:
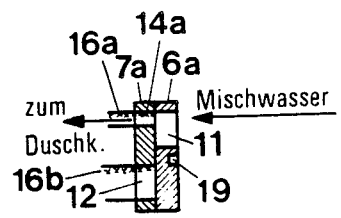
FIG. 12 is the section H—H in FIG. 11.
Figure 9:
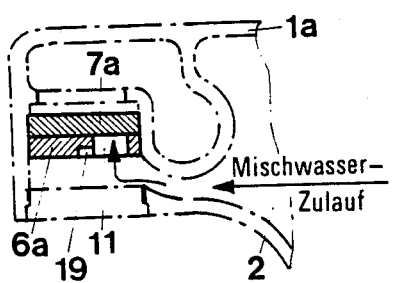
FIG. 9 is a horizontal section G—G in FIG. 10 of a second example of a mixer tap according to the invention.
Figure 13:
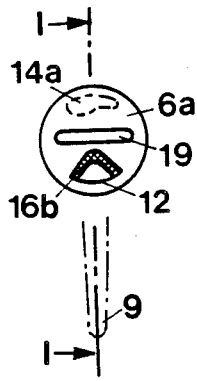
FIG. 13 is the elevation of the regulating valve arrangement of the FIG. 9 mixer tap in the open position of the regulating valve associated with the direct outlet.
Figure 14:
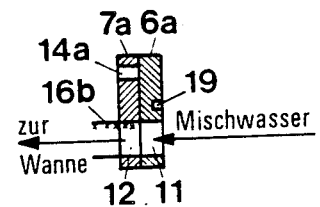
FIG. 14 is the section I—I in FIG. 13.

In the FIGS. 9 and 10 position of lever 9 and disc 6a, both regulating valves are shut, in the FIGS. 11 and 12 position only the regulating valve 6a, 11, 14a for the shower head is open and in the FIGS. 13 and 14 position only the regulating valve 6a, 11, 12 for the direct outlet to the bath is open.

Instead of to a bath, the outlet can also be to the floor or ground (in a shower bath).

We claim:

1. A shower and bath mixing valve adapted for directing the flow of water to a shower head and alternately for a bath, comprising, a housing having an inlet port, a shower head outlet port adapted for connection to a shower head, and a bath outlet port, a first valve member joined to the housing in fixed relationship to the housing and having an inlet first aperture extending therethrough in fluid communication with the inlet port and an outlet aperture extending therethrough and in fluid communication with the shower head port, a second valve member rotatably mounted in the housing and having an aperture extending therethrough that is adapted to fluidly connect the first valve member inlet aperture to the bath port, a fluid passage portion adapted to fluidly connect the first valve member inlet aperture to the shower head port and a fluid flow blocking portion adapted to block fluid flow between the first valve member inlet aperture and both of the second valve member aperture and fluid passage portion and selectively block fluid flow from the first valve member inlet aperture to the respective one of the second valve member second aperture and fluid passage portion, and being mounted in the housing in abutting relationship with the first valve member for rotation between a datum off first position that the fluid flow blocking portion blocks the first valve member first aperture to block fluid flow from the housing inlet port to either of the housing outlet ports, a fully open bath flow position that the second valve member aperture fluidly connects the first valve member inlet aperture to the bath outlet port and the fluid flow blocking portion blocks fluid flow between the shower head port and the first valve member inlet port, and a fully open shower head flow position that the second valve member fluid passage portion fluidly connects the inlet aperture to the shower head port and the fluid flow blocking portion blocks fluid flow between the bath port and the inlet aperture, the first valve member aperture, the second valve member aperture and the fluid passage portion being of relative sizes that the maximum fluid flow to the shower head port is less than the maximum flow to the bath port, and means connected to the second valve member for rotating the second valve member between its positions.

2. The apparatus of claim 1 further characterized in that the first valve member inlet aperture is of a larger size than the first valve member outlet aperture and that the second valve member aperture is of the same size as the first valve member inlet aperture.

3. The apparatus of claim 1 further characterized in that the second valve member fluid passage portion comprises a disk shaped recess portion that in the second valve member shower head flow position bridges the first valve member apertures and effects gradual blocking thereof for smooth opening and closing action as the second valve member is moved to and from its fully open shower head flow position.

4. A mixing valve adapted for directing the flow of water to a shower head and alternately for a bath, comprising, a housing having an inlet port, a shower head outlet port adapted for connection to a shower head and a bath outlet port, a first and a second regulating valve that are operable to an off position blocking fluid flow from the inlet port to each of the shower head port and bath port and are associated with the respective shower head port and bath port to provide a greater maximum water flow from the housing inlet to the bath port than to the shower head port, the regulating valves including at least a first and a second disk abutting against the first disk, the first disk being a control element for both valves and mounted in the housing for rotation between a first predetermined position that fully opens one regulating valve and blocks fluid flow through the other, a second predetermined position that fully opens the other regulating valve and block fluid flow through the one regulating valve, and a third position blocking fluid flow through both valves, the first disk having an aperture, the second disk being mounted in a fixed position in the housing and having a first aperture and a second aperture of a larger size than the second disk first aperture and of the same size as the first disk aperture, the first disk in one of its predetermined positions having its aperture in registry with the second disk second aperture for establishing a water flow path from the housing inlet to the bath port, the first disk in a second of its predetermined positions establishing a water flow path from the housing inlet of the shower head port for water to flow through the second disk first aperture and before flowing through the second disk first aperture flows through one of the first disk aperture and the second disk second aperture, and handle means connected to the first disk to rotate the first disk between its position.

5. The apparatus of claim 4 further characterized in that the first disk aperture and second disk second aperture are of shapes of a segment of a circle.

6. A mixing valve adapted for directing the flow of water to a shower head and alternately for a bath, comprising, a housing having an inlet port, a shower head outlet port adapted for connection to a shower head and a bath outlet, a first and a second regulating valve that are operable to an off position blocking fluid flow from the inlet port to each of the shower head port and bath port and are associated with the respective shower head port and bath port to provide a greater maximum water flow from the housing inlet to the bath port than to the shower head port, the regulating valves including a disk and disk means in abutting relationship to the disk, the disk means being a control element for both valves and mounted in the housing for rotation between a first predetermined position that fully opens one regulating valve and blocks fluid flow through the other, a second predetermined position that fully opens the regulating valve and blocks fluid flow through the one regulating valve, and a third position blocking fluid flow through both valves, the disk means having an aperture, the disk being mounted in a fixed position in the housing and having a first aperture and a second aperture of a larger size than the disk first aperture, the disk means in one of its predetermined positions having its aperture in registry with the disk second aperture for establishing a water flow path from the housing inlet to the bath port, the disk means in a second of its predetermined positions providing a water flow path between the housing inlet and the shower head port that includes passing through the disk first aperture and before passing through the disk first aperture, passes through one of the disk means aperture and the disk second aperture.

* * * * *